July 7, 1970

G. C. BUTLER 3,518,739

TRACKING ROLLER

Filed May 29, 1968

INVENTOR.
GORDON C. BUTLER

BY

ATTORNEY

July 7, 1970           G. C. BUTLER           3,518,739

TRACKING ROLLER

Filed May 29, 1968                                    2 Sheets-Sheet 2

United States Patent Office 3,518,739
Patented July 7, 1970

3,518,739
TRACKING ROLLER
Gordon Charles Butler, Fairport, N.Y., assignor to Xerox Corporation, Rochester, N.Y., a corporation of New York
Filed May 29, 1968, Ser. No. 732,940
Int. Cl. F16h 7/18
U.S. Cl. 29—123           12 Claims

ABSTRACT OF THE DISCLOSURE

A steering roller for automatically tracking a web of material passing thereover including a cylinder supported on a pair of axles, offset from the rollers axis of rotation, by means of spherical bearings. The outer surface of the cylinder carries a pair of resilient bearing flanges which when engaged by an edge of the web material passing thereover displace the cylinder's axis of rotation by moving the cylinder laterally along the axles and at an angle relative to the web materials path of movement to automatically track the passing web into a predetermined path of movement.

BACKGROUND OF THE INVENTION

This invention relates to apparatus for regulating the lateral movement of an endless belt and more specifically, for automatically centering a moving endless belt between preselected confines without causing distortion of the belt cross section.

In particular, this invention relates to a self-steering roller which in conjunction with one or more additional supporting or drive rollers, is capable of maintaining the path of a moving xerographic belt within narrow limits without causing surface deformation or edge damage to the belt.

When wide, thin and flexible belts are driven about a series of rollers there is a tendency for the belt to drift laterally across the rollers and, if not compensated for, the belt will be eventually carried completely off the roller peripheral surface. This lateral movement of the belt is caused by one or a combination of the following factors each of which is ever present to some degree: misalignment of the rolls, uneven wearing along a roller surface, and camber or lateral curvature of the strip material. This lateral movement affects both the operation and the wearing characteristics of the belts and the rollers and limits the effective useful life of the wide flexible belt material.

Various apparatus for correcting for lateral shift of moving belt material are well known in the art. However, some of the better known apparatus such as crown rollers work well with rigid rollers and resilient belts, but when the belt material is rigid, high tensions are required to effect tracking which produce local stresses at the crown of the roll resulting in belt damage. In addition, crown rollers force the belt in toward the apex of the roll, thus creating a bulge and a distortion of the belt surface. Another well known mechanism for maintaining belt tracking is a roll with a rigid flange on each end. However, flanged rolls produce concentrated loading at the edges of the belt resulting in execssive wear, edge buckling and seam spltting. Furthermore, such systems as an electro-servo mechanism, which are expensive and elaborate, require micro switches which sense the edge of the belt and detect any movement to energize suitable motors for driving the rollers to counteract the lateral shift in the belt. These mechanisms continually move the belt back and forth in a lateral manner as the belt contacts the sensing devices positioned alongside.

The invention of this application is utilized in an automatic xerographic reproducing apparatus wherein the belt comprises a flexible brass substrate supporting a layer of photoconductive material such as selenium. Electrostatic images of copy to be reproduced are formed on the surface of the belt commonly by optical projection, and are developed therein with a powder which is subsequently transferred to a final copy of support material. The alignment of the original image on the belt and its subsequent transfer to the support material is critical and the registration must be controlled within precise tolerances. Therefore, the lateral movement of the belt itself is critical and the problem of tracking the belt is much greater than belt tracking of prior art devices. In addition, due to the nature of the substrate and the photoconductive material supported thereon, the tracking operation must be accomplished without the introduction of deformity-producing stresses into the belt which would effect the image produced thereon.

SUMMARY OF THE INVENTION

It is, therefore, an object of this invention to improve belt tracking apparatus.

Another object of this invention is to improve belt tracking apparatus by eliminating stresses induced into the belt which cause surface deformation.

A further object of this invention is to improve belt steering apparatus by minimizing corrective forces applied to the edges of the belt material.

Still another object of this invention is to improve belt steering apparatus by effecting periodic correctional movement to the moving belt in proportion to the lateral displacement of the belt surface.

These and other objects are obtained in accordance with the present invention wherein there is provided a simple and inexpensive self-contained tiltable steering roller assembly which in conjunction with one or more additional supporting or driving rollers, is capable of maintaining the path of a moving belt within a predetermined lateral deviation without causing deformation to the belt surface or edge damage thereto. The steering roller includes a smooth surfaced one-piece cylindrical full-bodied roller supported on a pair of universal spherical bearings whereby the roller may be rotated and shifted laterally relative to a pair of stub shafts, offset to the cylinders axis of rotation, such that the forces exered on the roller assembly due to the lateral movement of the belt passing thereover will induce a compensating movement of the roller in relation to the lateral deviation of the belt upon the roller surface.

DESCRIPTION OF THE DRAWINGS

Further objects of this invention, together with additional features contributing thereto and advantages accuring herefrom, will be apparent from the following description of one embodiment of the invention when read in conjunction with the accompanying drawings wherein.

DESCRIPTION OF A PREFERRED EMBODIMENT

Figure 1:
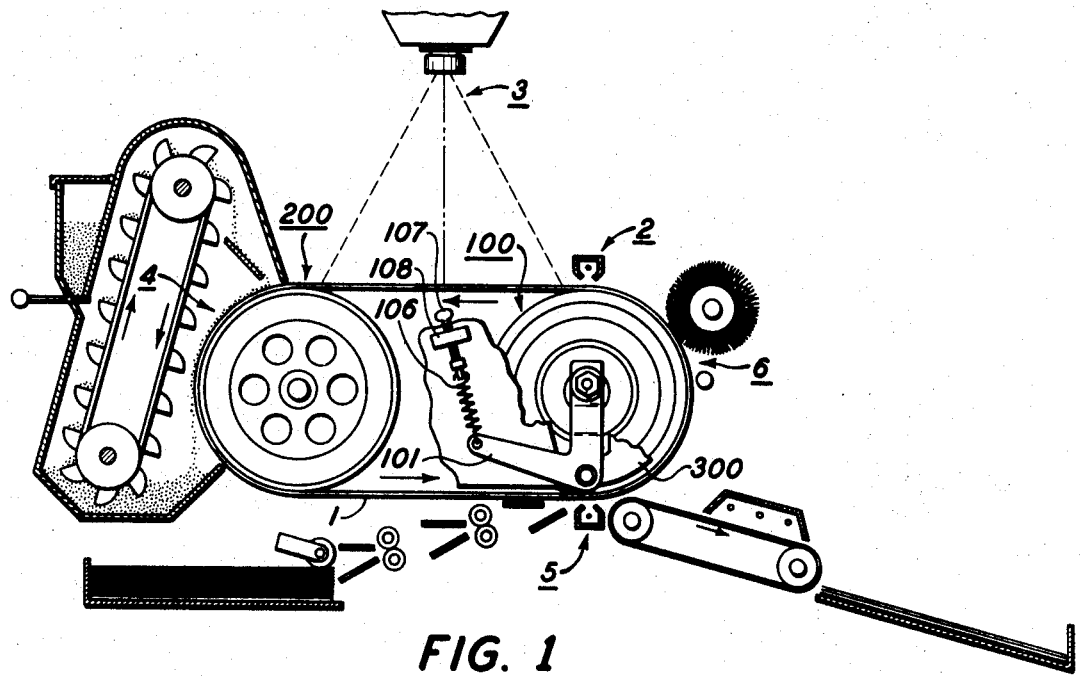
FIG. 1 is a schematic illustration of an automatic xerographic reproducing machine utilizing the invention of this application.

Referring now to FIG. 1, there is illustrated a schematic representation of an automatic xerographic reproducing machine utilizing the invention of this application, although it should be noted that the invention is not intended to be limited thereto.

The automatic xerographic reproducing machine represented in FIG. 1 includes a xerographic plate 1 including a photoconductive layer or light receiving surface on a conductive backing formed into an endless web or belt to rotate in the direction indicated by the arrow to cause the plate surface to sequentially pass a series of xerographic processing stations.

For the purposes of the present disclosure, the several xerographic processing stations in the path of movement of the plate surface may be described functionally, as follows:

A charging station 2 at which a uniform electrostatic charge is deposited on or in the photoconductive plate;

An exposure station 3 at which a light or radiation pattern of copy to be reproduced is projected onto the plate surface to dissipate the charge in the exposed areas thereof to thereby form a latent electrostatic image of the copy to be reproduced;

A developing station 4 at which the xerographic developing material, including toner particles having an electrostatic charge opposite to that of the latent electrostatic image, are applied to the plate surface whereby the toner particles adhere to the latent electrostatic image to form a toner-powder image in configuration of the copy being reproduced;

A transfer station 5 at which the toner-powder image is electrostatically transferred from the plate surface to a transfer material or a support surface; and A plate cleaning station 6 at which the plate surface is brushed to remove residual toner particles remaining thereon after image transfer, and exposed to a relatively bright light source to effect substantially complete discharge of any residual electrostatic charge remaining thereon or therein.

As shown in FIG. 1, the xerographic plate or belt 1 is constrained about a pair of rollers 100 and 200 rotatably supported in a frame member 300 to rotate the xerographic belt through the several xerographic processing stations an to maintain precise alignment of the belt on the rollers.

Figure 3:
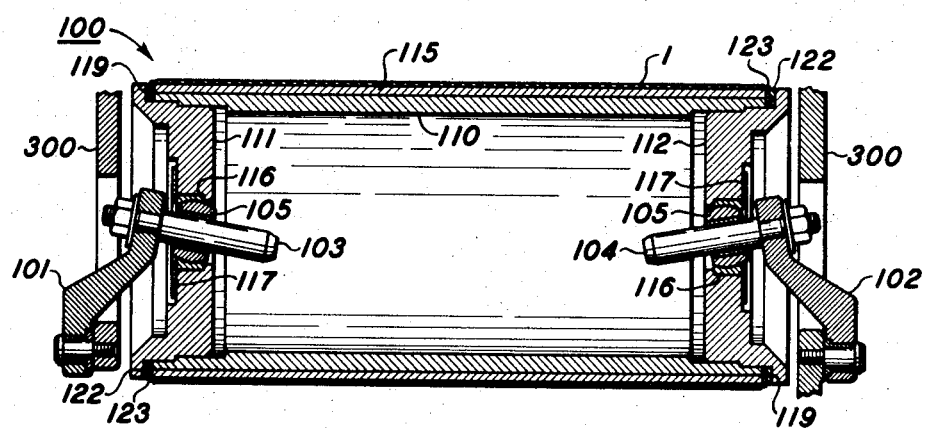
FIG. 3 is a vertical section view of the apparatus shown in FIG. 2 taken along lines 3—3.
Figure 2:
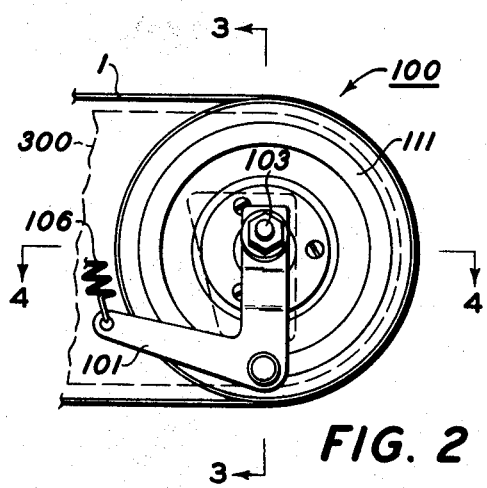
FIG. 2 is a vertical end profile of the subject invention to better illustrate the support members thereof.
Figure 4:
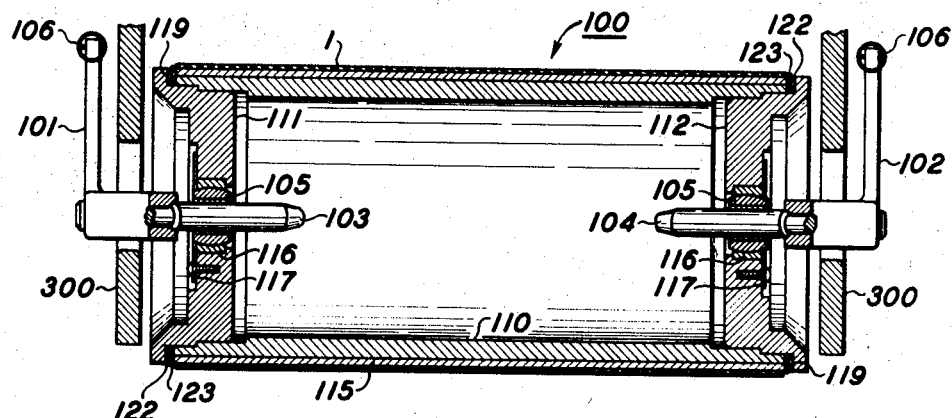
FIG. 4 is a horizontal section view of the apparatus shown in FIG. 2 taken along lines 4—4; and, FIG. 5(a) and 5(b) are schematic representations of the balancing forces applied to the tracking roller to better illustrate the operation thereof with FIG. 5(a) illustrating a horizontal profile of the steering roller and belt and FIG. 5(b) illustrating a vertical profile of the steering roller and belt with the belt shown advancing into the plane of the drawing sheet.

The xerographic belt is maintained in a precise predetermined alignment by means of the steering roller assembly 100 generally shown in FIG. 1 and, more specifically, in FIGS. 2 through 4. The steering roller 100 is supported from the frame 300, appropriately secured within the automatic xerographic reproducing machine in a manner such that the xerographic plate 1 operatively contacts all the several xerographic processing stations, by means of left and right support arms 101 and 102, respectively. A pair of stub shafts or axles 103 and 104 are secured in the support arms 101 and 102 with each stub shaft having a universal spherical bearing 105 journaled thereon for axial movement along the shafts to allow the roller 100 to be laterally displaced in relation to the frame to compensate for lateral shifting of the xerographic belt 1 passing thereover, as hereinafter described in detail.

Left and right support arms 101 and 102, respectively, each form a bell-crank having one arm connected to springs 106 for initial adjustment of the position of the support arms. The opposite end of springs 106 are each connected to an adjusting screw 107 threaded through a bracket 108 appropriately secured to the frame member 300. This independent suspension of the support arms 101 and 102 allows an initial adjustment of the xerographic belt 1 to compensate for any permanent fixed taper in the belt by permitting the steering roller 100 to be positioned such that its axis of rotation is parallel to the planes formed by the path of belt movement, but at an angle with the axis of rotation of roller 200. Since tracking of the xerographic belt 1 is accomplished by the pivotal movement of the steering roller 100 such that its axis of rotation is positioned at an angle to the planes formed by the moving xerographic belt 1 (to be explained in detail hereinafter) this initial positioning of the steering roller 100 by movement of the adjusting screws 107 does not interfere with belt tracking.

The roller 100, over which the xerographic belt passes, includes left and right end flanges 111 and 112, respectively, journaled for rotation upon bearings 105 with the outer race of the bearing secured in the flanges against an inner shoulder 116 by means of a retaining ring 117. A cylinder 110 is secured to and supported from flanges 111 and 112 and has supported thereon a resilient elastomeric sleeve 115 having a smooth continuous surface about which the xerographic belt 1 passes. The end flanges 111 and 112 are each formed with an external shoulder 119 having an elastomeric rubber ring 122 positioned thereagainst with a rigid metallic bearing flange ring 123 supported on each end flange 111 and 112 between the inner and outer cylinders 110 and 115. The rigid metallic bearing rings 123 extend above the surface of sleeve 115, as best illustrated in FIGS. 3 and 4, for a purpose to be hereinafter described in detail.

The operation of the steering roller 100, in tracking the xerographic belt passing thereover, will now be described in detail with reference to the force vector schematic representation shown in FIGS. 5(a) and 5(b).

Figure 5A:
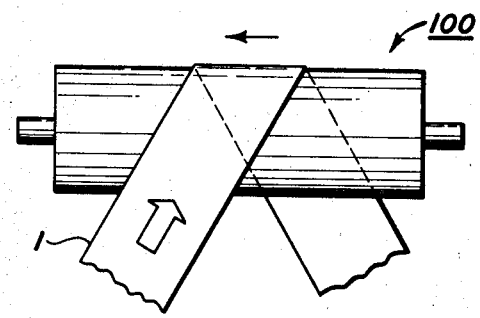
Figure 5B:
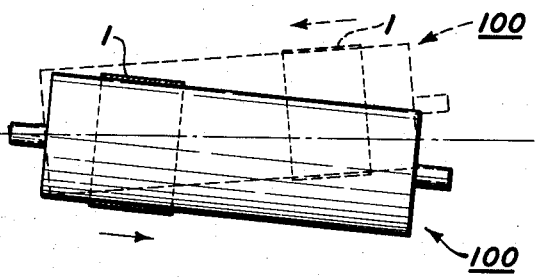

FIGS. 5(a) and 5(b) illustrate the principal of the xerographic belt 1 passing about the steering roller 100 which produces lateral movement or drift of the belt along the roller surface. If the axis of rotation and the surface of the roller were exactly parallel, and the xerographic belt approached the roller perpendicular to the axis of rotation, then each successive point on the belt would contact the roller at the same relative position, that is, the plane having all points of contact would be perpendicular to the axis of the roller. However, in normal operation the surfaces of the roller are not exactly parallel to the axis of the roller, and the belt does not aproach the roller exactly perpendicular to the outer surface. Thus, the belt does not contact the surface of the roller at the same relative position for each succeeding point. As can be seen in FIG. 5(a), when the xerographic belt 1 approaches the roller 100 at an angle, each incremental area of the belt comes into contact with a different lateral point along the surface of the roller. Each succeeding point is laterally displaced further along the roller surface in the direction indicated by the arrow, and, unless there is relative movement between the belt and the roller, the belt will tend to move along the roller in the direction indicated by the arrow until it finally falls from the roller surface. This movement, which has been exaggerated in FIG. 5(a) for clarity, is produced by any variation in the angle at which the belt 1 approaches the roller 100.

This lateral drift can be produced by varying the position of the roller axis rather than the angle of approach of the belt. As shown in FIG. 5(b) the angle between the xerographic belt 1 and the surface of the roller 100 can be varied by moving the axis of the roller in either direction thus producing belt movement in the direction of the arrow in the same manner as described above. As can be clearly seen in FIG. 5(b), a change in the angle of the roller axis of rotation relative to the belt produces a corresponding movement or lateral drift of the belt along the surface of the roller. By adjusting the position of the axis relative to the web travel, the belt may be tracked along the roller so that the drift or lateral displacement is kept to a minimum.

The self-steering roller 100 automatically compensates for lateral displacement of the xerographic belt 1, by means of the movement of the axis of rotation of the steering roller 100 in response to the lateral displacement of the passing xerographic belt. This displacement of the roller axis of rotation is accomplished by the xerographic belt passing over the sleeve 115 and bearing against either of the bearing flanges 123. The force exerted by the passing xerographic belt against either of the bearing flanges causes the steering roller to be pivoted about the stub axles 103 or 104 by means of the universal bearings and laterally displaced therealong. This pivotal movement varies the axis of rotation of the roller relative to the path of the xerographic belt travel, and thereby produces a balancing force on the xerographic belt to track the belt back to the proper position. Since the metal flanges are spaced from the outer external shoulder 119 of the end flanges 111 and 112 by means of the resilient rubber ring 122, the movement of the edges of the belt against the bearing flange does not suddenly load and thereby distort the belt edges. This movement steadily increases the force against the edge of the belt to a sufficient amount whereby the axis of rotation of the steering roller will be shifted relative to the xerographic belt's path of travel, thereby inducing the counter balancing or self-steering force on the belt 1. The belt will then continue in its normal path of travel, and any deviation from that predetermined path of travel will result in the belt bearing against the metal bearing flanges 123 to pivot the self-steering roller causing a movement of the axis of rotation relative to the path of the xerographic belt inducing the self-steering or counteracting balancing force to cause the belt to again resume its normal path of travel.

What is claimed is:

1. A self steering roller assembly for tracking a web of material passing thereover in a predetermined path of movement comprising:
   a cylindrical member adapted for rotation about the longitudinal central axis to support a moving web of material over a peripheral portion thereof,
   first and second shafts supported externally of said cylindrical member at either end thereof and extending internally within said cylindrical member, each of said shafts being inclined at an angle from the central axis of said cylindrical member,
   first and second bearing members supported for axial movement along said first and said second shafts respectively,
   first and second end flanges secured at either end of said cylindrical member, and
   means operatively connecting said first and said second bearing members in said first and said second end flanges respectively to permit a rotational movement of said cylindrical member about the longitudinal central axis thereof and a translational movement along the respective axis of said first and said second shafts.

2. A self steering roller assembly for tracking a web of material passing thereover in a predetermined path of movement comprising:
   a cylindrical member adapted for rotation about the longitudinal central axis to support a moving web of material over a peripheral portion thereof,
   first and second shafts supported externally of said cylindrical member at either end thereof and extending internally within said cylindrical member, each of said shafts being inclined at an angle from the central axis of said cylindrical member,
   first and second bearing members supported for axial movement along said first and said second shafts respectively,
   first and second end flanges secured at either end of said cylindrical member, said end flanges including an external shoulder portion extending radially beyond the peripheral surface of said cylindrical member, and
   means operatively connecting said first and said second bearing members in said first and said second end flanges respectively to permit a rotational movement of said cylindrical member about the central axis thereof and a translational movement along the respective axis of said first and said second shafts in response to a deviation in the path of movement of said web material from a predetermined path of movement over said cylindrical member.

3. Apparatus according to claim 2, said external shoulder portions further including:
   a substantially incompressible ring member adapted to be engaged by a respectively associated edge of said web material upon deviation by said web material from said predetermined path of movement, and
   a resiliently deformable ring member supported between said shoulder portion and said incompressible ring member to translate a deviation of said web material from said predetermined path of movement on said cylindrical member to a transverse movement of said cylindrical member along said first and said second shafts.

4. In an automatic xerographic reproducing machine, a self-steering roller assembly for tracking an endless photo-receptive web in a predetermined path of movement past a series of xerographic processing stations comprising:
   a cylindrical member adapted for rotation about the longitudinal central axis to support a moving endless photoreceptive web over a peripheral portion thereof,
   first and second shafts supported externally of said cylindrical member at either end thereof and extending internally within said cylindrical member, each of said shafts being inclined at an angle from the central axis of said cylindrical member,
   first and second bearing members supported for axial movement along said first and said second shafts respectively,
   first and second end flanges secured at either end of said cylindrical member, and
   means operatively connecting said first and said second bearing members in said first and said second end flanges respectively to permit a rotational movement of said cylindrical member about the longitudinal central axis thereof and a translational movement along the respective axis of said first and said second shafts.

5. In an automatic xerographic reproducing machine, a self-steering roller assembly for tracking an endless photo-receptive web in a predetermined path of movement past a series of xerographic processing stations comprising:
   a cylindrical member adapted for rotation about the longitudinal central axis to support a moving endless photoreceptive web over a peripheral portion thereof,
   first and second shafts supported externally of said cylindrical member at either end thereof and extending internally within said cylindrical member, each of said shafts being inclined at an angle from the central axis of said cylindrical member,
   first and second bearing members supported for axial movement along said first and second shafts respectively,
   first and second end flanges secured at either end of said cylindrical member, said end flanges including an external shoulder portion extending radially beyond the peripheral surface of said cylindrical member, and
   means operatively connecting said first and said second bearing members in said first and said second end flanges respectively to permit a rotational movement of said cylindrical member about the central axis thereof and a translational movement along the respective axis of said first and said second shafts in response to a deviation in the path of movement of said photoreceptive web from a predetermined path of movement over said cylindrical member.

6. Apparatus according to claim 5, said external shoulder portions further including:
a substantially incompressible ring member adapted to be engaged by a respectively associated edge of said photoreceptive web upon deviation by said web from said predetermined path of movement, and
a resiliently deformable ring member supported between said shoulder portion and said incompressible ring member to translate a deviation of said photoreceptive web from said predetermined path of movement on said cylindrical member to a transverse movement of said cylindrical member along said first and said second shafts.

7. A self-steering roller assembly for tracking an endless web of material along a predetermined path of travel in a closed loop comprising:
a cylindrical member for supporting said web over a peripheral portion thereof and adapted for rotation about the longitudinal central axis,
first and second shafts supported externally of said cylindrical member at either end thereof and extending internally within said cylindrical member, each of said shafts being inclined at an angle from the central axis of said cylindrical member,
first and second bearing members supported for axial movement along said first and said second shafts respectively,
first and second end flanges secured at either end of said cylindrical member, and
means operatively connecting said first and said second bearing members in said first and said second end flanges respectively to permit a rotational movement of said cylindrical member about the longitudinal central axis thereof and a translational movement along the respective axis of said first and said second shafts.

8. Apparatus according to claim 7, further including:
means supporting said first and said second shafts for movement in a direction generally inwardly of said closed loop, and
means normally biasing said first and said second shafts and said cylindrical member in a direction generally outwardly of said closed loop.

9. A self-steering roller assembly for tracking an endless web of material along a predetermined path of travel in a closed loop comprising:
a cylindrical member for supporting said web over a peripheral portion thereof and adapted for rotation about the longitudinal central axis,
first and second shafts supported externally of said cylindrical member at either end thereof and extending internally within said cylindrical member, each of said shafts being inclined at an angle from the central axis of said cylindrical member,
first and second bearing members supported for axial movement along said first and said second shafts respectively,
first and second end flanges including an external shoulder portion extending radially beyond the peripheral surface of said cylindrical member, and
means operatively connecting said first and said second bearing members in said first and said second end flanges respectively to permit a rotational movement of said cylindrical member about the central axis thereof and a translational movement along the respective axis of said first and said second shafts in response to a deviation in the path of movement of said web material from a predetermined path of travel over said cylindrical member.

10. Apparatus according to claim 9, said external shoulder portions further including:
a substantially incompressible ring member adapted to be engaged by a respectively associated edge of said web material upon deviation by said web material from said predetermined path of movement, and
a resiliently deformable ring member supported between said shoulder portion and said incompressible ring member to translate a deviation of said web material from said predetermined path of movement on said cylindrical member to a transverse movement of said cylindrical member along said first and said second shafts.

11. Apparatus according to claim 9, further including:
means supporting said first and said second shafts for independent movement in a direction generally inwardly of said closed loop, and
means normally biasing said first and said second shafts and said cylindrical member in a direction generally outwardly of said closed loop.

12. Apparatus according ot claim 11, further including:
means operatively associated with said biasing means for independent adjustment of the outwardly movement of said first and said second shafts.

References Cited

UNITED STATES PATENTS

| 1,432,832 | 10/1922 | Brockett | 74—241 |
| 2,096,015 | 10/1937 | Meister et al. | |
| 2,927,210 | 3/1960 | O'Mara | 250—65.1 |
| 3,029,657 | 4/1962 | Roper | 74—241 |
| 3,149,497 | 9/1964 | Haugen | 74—241 |
| 3,168,027 | 2/1965 | Mastroianni | 355—104 |

WILLIAM I. PRICE, Primary Examiner

L. G. MACHLIN, Assistant Examiner

U.S. Cl. X.R.

74—241